United States Patent
Sacristan San Martin et al.

(10) Patent No.: US 12,044,217 B2
(45) Date of Patent: Jul. 23, 2024

(54) WIND TURBINE

(71) Applicant: Siemens Gamesa Renewable Energy Innovation & Technology S.L., Sarriguren (ES)

(72) Inventors: Juan Manuel Sacristan San Martin, Amurrio Araba (ES); Jaime Peredo Argos, Santander (ES)

(73) Assignee: SIEMENS GAMESA RENEWABLE ENERGY INNOVATION & TECHNOLOGY S.L., Sarriguren (ES)

(*) Notice: Subject to any disclaimer, the term of this patent is extended or adjusted under 35 U.S.C. 154(b) by 0 days.

(21) Appl. No.: 17/959,424

(22) Filed: Oct. 4, 2022

(65) Prior Publication Data
US 2023/0116762 A1 Apr. 13, 2023

(30) Foreign Application Priority Data

Oct. 12, 2021 (EP) .................................. 21382916

(51) Int. Cl.
*F03D 80/30* (2016.01)
*F03D 80/80* (2016.01)

(52) U.S. Cl.
CPC .................... *F03D 80/80* (2016.05)

(58) Field of Classification Search
None
See application file for complete search history.

(56) References Cited

U.S. PATENT DOCUMENTS

| | | | |
|---|---|---|---|
| 4,757,211 A | 7/1988 | Kristensen | |
| 8,721,258 B2* | 5/2014 | Eriksen | F03D 80/50 415/4.5 |
| 8,814,516 B2* | 8/2014 | Lind | F03D 80/50 416/95 |
| 9,512,823 B2* | 12/2016 | Nyvad | F03D 80/60 |
| 9,670,898 B2* | 6/2017 | Abolfazlian | F03D 80/80 |
| 9,683,555 B2* | 6/2017 | Arndt | F03D 13/20 |
| 9,909,559 B2* | 3/2018 | Lohan | F16C 35/062 |
| 10,982,659 B2* | 4/2021 | Madsen | B66C 23/207 |
| 11,221,000 B2* | 1/2022 | Aitken | F03D 80/50 |
| 2015/0152881 A1 | 6/2015 | Tirumalai et al. | |

FOREIGN PATENT DOCUMENTS

| | | |
|---|---|---|
| EP | 2412970 A1 | 2/2012 |
| EP | 3246561 A1 | 11/2017 |
| WO | WO 9206295 A1 | 4/1992 |

* cited by examiner

*Primary Examiner* — Kayla McCaffrey
(74) *Attorney, Agent, or Firm* — Schmeiser, Olsen & Watts LLP

(57) ABSTRACT

A wind turbine is provided including a nacelle and a plurality of electrical and/or mechanical components for the generation and/or the conversion of energy, wherein the nacelle includes a housing structure enclosing an inner volume, in which the components are arranged, wherein the nacelle includes at least one movable extension structure, which may be moved between a retracted position and an extended position, wherein the inner volume enclosed by the housing structure is increased in the extended position.

10 Claims, 3 Drawing Sheets

WIND TURBINE

CROSS-REFERENCE TO RELATED APPLICATIONS

This application claims priority to EP Application No. 21382916.1, having a filing date of Oct. 12, 2021, the entire contents of which are hereby incorporated by reference.

FIELD OF TECHNOLOGY

The following relates to a wind turbine comprising a nacelle and a plurality of electrical and/or mechanical components for the generation and/or the conversion of energy, wherein the nacelle comprises a housing structure enclosing an inner volume, in which the components are arranged.

BACKGROUND

Wind turbines generally comprise a tower, which supports a nacelle of the wind turbine. To the nacelle, the rotor of the wind turbine comprising a hub and a plurality of rotor blades is mounted, wherein inside the nacelle, the components used for the generation and/or conversion of electrical energy are arranged. With these components, the rotational energy of the rotor induced by the wind can be used to generate electrical energy that may be fed for instance into a power grid.

In the interior of the nacelle, the components used for the generation and/or the conversion of energy have to be arranged in such manner that for instance the conductance of maintenance tasks in the interior of the nacelle remain possible. Therefore, sufficient space around the components is required to allow for accessing the components and for moving in the nacelle, wherein the required space determines a certain layout of the components and/or minimum distances between the components.

Along with rising powers to be generated with the wind turbines, also the components grow in size reducing the remaining free space in the interior of the nacelle. The usage of larger nacelles, hence of nacelles which are at least longer and/or wider, is generally possible in order to maintain a certain layout and/or minimum distances between the components. However, it is not desired since larger nacelles are more difficult to handle, to transport and to install. In addition, a larger nacelle may increase the loads acting on a yaw bearing and/or on a tower, in particular during operation of the wind turbine.

SUMMARY

An aspect relates to an improved wind turbine which facilitates the access to the components in the interior of the nacelle.

According to embodiments of the invention, this problem is solved by a wind turbine as initially described, wherein the nacelle comprises at least one movable extension structure, which may be moved between a retracted position and an extended position, wherein the inner volume enclosed by the housing structure is increased in the extended position.

The at least one movable extension structure has the advantage that by moving the extension structure from the retracted position to the extended position, more space in the interior of the nacelle may be provided. In an embodiment, the interior of the nacelle becomes extendible by the extension structure. The additional space provided by the extended extension structure may facilitate repair and/or maintenance procedures, in particular with regard to the movement of workers in the interior of the nacelle and/or to the transport of spare parts or the like in the nacelle.

During handling of the nacelle for transport and/or installation, the extension structure can be kept in the retracted position, so that a smaller size of the nacelle is obtained facilitating transport and installation procedures. Also, during normal operation of the wind turbine, the movable extension structure can be positioned in the retracted position. This may reduce for instance the loads that are acting on the tower and/or on a yaw bearing, which couples the nacelle to the tower. In particular for transport and installation procedures, the required effort and the costs can be reduced by using smaller nacelles, in which the access to the components for maintenance procedures is providable by the at least one extension structure.

For maintenance procedures, when additional space in the nacelle is required, the extension structure can be moved to the extended position, so that the inner volume of the nacelle is increased and additional space in the interior of the nacelle is provided. This allows for temporally increasing the inner volume of the nacelle and therefore also the outer dimensions like the length, the width and/or the height of the nacelle only when the additional space is required.

The housing structure of the nacelle encloses the inner volume of the nacelle, or the interior of the nacelle, respectively. The components that are arranged in the nacelle may be part of a drive train of the wind turbine and comprise in particular a main shaft, which is coupled to a rotatable hub of the wind turbine blade, as well as an electrical machine that may be used as a generator. The components may further comprise a gear box, which couples the main shaft to the generator, and which adapts their rotational speeds.

For conversion of electrical energy and/or for providing a current for energizing a part of the generator, one or more converters and/or one or more transformers may be provided as components. The housing structure, which surrounds the interior of the nacelle and therefore also the components, may comprise for instance a canopy and protects the components from environmental influences.

The movable extension structure may be moved between the retracted position and the extended position. In the extended position, the inner volume enclosed by the housing structure is increased compared to the retracted position. The additional volume created by moving the extension structure to the extended position may be used to provide more space in particular in the vicinity of one or more of the components, so that a conduction of maintenance tasks at these components and/or a movement or a transport of parts around the component is facilitated. This allows for providing no or only small gaps between adjacently arranged components and/or between the components and the housing structure, since an access to the components and/or a movement around or between the components becomes possible by providing an additional inner volume created by moving the extension structure to the extended position.

The movable extension structure may be a movable compartment, which can be extended and retracted for adapting the space in the interior of the nacelle. It is in particular possible that the nacelle comprises more than one movable extension structure, in particular to provide additional space on different sides of the nacelle and/or at different positions at one side of the nacelle.

In an embodiment, the extension structure is movable in a lateral direction, wherein the extension structure extends the inner volume at a side wall of the nacelle and/or at a rear end of the nacelle. The side walls of the nacelle extend between a front side of the nacelle, to which the hub is mounted, and an opposing rear end of the nacelle.

By providing an extension structure on a side wall of the nacelle, the width of the nacelle can be increased at least locally by moving the movable extension structure from the retracted position to the extended position. The width of the nacelle may be increased over the entire length of the nacelle or within a section of the length of the nacelle. The additional width gained from the extended extension structure may therefore be used for facilitating the access to at least one of the components and/or for facilitating a movement or a transport of parts around or along at least one of the components.

By an extension structure arranged at the rear end of the nacelle, the length of the nacelle may be increased over the entire width or within a portion of the width, respectively. It is possible that the nacelle comprises more than one extension structure, for instance at least one extension structure on each of the side wall and/or at least one extension structure at the rear end of the nacelle, depending on the arrangement of the components in the interior of the nacelle.

In an embodiment, the distance between at least one of the components and at least one section of the housing structure and/or the distance between at least two of the components is increased in the extended position. This facilitates the access to the components and the movement in the interior of the nacelle.

A segment of the housing structure, which is in the extended position in a greater distance to one of the components of the extension structure, may be coupled to the extension structure so that by moving the extension structure from the retracted to the extended position, also the housing segment is moved. This may increase the distance between the housing segment and at least one of the components so that also the free space in front of the component is increased.

It is also possible that at least one component is coupled to the movable extension structure so that the component is moved by extending the extension structure. This allows for increasing the distance between two or more components and therefore for providing additional free space between the components.

In an embodiment, the positions of the components in the nacelle remain the same when the extension structure is arranged in the extended position, or at least one of the components is coupled to the extension structure, wherein the position of this component relative to the remainder of the components is changed when the extension structure is arranged in the extended position.

In an embodiment, the component coupled to the extension structure is a converter and/or a transformer. A converter and a transformer may be electrically connected to further components in the interior of the nacelle, for instance by cables. Unlike mechanically connected components, the electrical connected components may be moved easily by coupling them to the movable extension structure, in particular due to the flexibility of the cables.

In an embodiment, the extension structure comprises a floor segment, wherein in the extended position, a floor structure of the nacelle is extended by the floor segment of the extension structure. The floor structure in the interior of the nacelle may be for instance a flooring, a grid structure or the like, wherein repair personal may walk on the floor structure through the nacelle. Also in the extension structure, a floor segment may be provided, so that in the extended position, the floor structure is extended by the floor segment of the extension structure.

In particular, the floor segment of the extension structure may abut the immobile floor structure in the interior of the nacelle when the extension structure is arranged in its extended position. This allows for creation of for instance a gangway around one or more of the components facilitating the access of a worker to these components and/or a worker to pass by or to move around the component, respectively. The floor segment of the movable extension structure may adjoin the immobile floor structure at an equal height or with a height offset.

In an embodiment, the extension structure comprises a length between 1 m and 10 m, in particular between 2 m and 5 m, and a width between 0.3 m and 3 m, in particular between 0.5 m and 0.8 m. Depending on the position of the extension structure at the nacelle, either the length or the width of the nacelle may be enlarged by the width of the extension structure, wherein the length or the width of the nacelle is increased over a distance corresponding to the length of the extension structure.

In an embodiment, at least one housing segment of the housing structure is attached to the extension structure, wherein the housing segment is connected to further segments of the housing structure by at least one flexible and/or foldable connection segment. The connection segment may comprise for instance a foldable bellow structure and/or it may be made at least partly of a flexible material, for example canvas or the like.

The connection segment connects the housing segment attached to the extension structure to the further segments of the housing structure, which are not attached to the extension structure and therefore immovable with respect to the components in the interior of the nacelle. The provision of at least one flexible and/or foldable connection segment allows for a shielding of the interior of the nacelle from environmental influences in also in the extended position of the extension structure.

In an embodiment, the extension structure is slidably coupled to a supporting structure of the nacelle. The supporting structure may be for instance a bedframe, which is coupled to a tower of the wind turbine, and/or a frame structure that is coupled to the bedframe.

In an embodiment, the extension structure is coupled to the supporting structure by one or more rails. By providing the rails, the extension structure may be slid between the retracted position and the extended position. In particular, for each extension structure, a plurality of rails attached to a bottom side and a top side of the extension structure may be used so that a stable guiding of the extension structure is obtained.

In an embodiment, the extension structure is movable by at least one manually operatable actuator and/or by at least one electric, hydraulic and/or pneumatic actuator. In particular, an extension structure, to which none of the components is coupled, may be manual operatable, hence movable, from the retracted position to the extended position. Alternatively, also for such an extension structure, an electric, hydraulic and a pneumatic actuator may be used.

Also, for an extension structure to which a component is attached, a manually operatable actuator and/or electric, hydraulic and a pneumatic actuator may be used. In this case, the usage of an electric, hydraulic and/or pneumatic actuator may be beneficial, since the component coupled to the extension structure may have a considerable weight, which must be moved when the extension structure is brought to the extended position. The at least one electric, hydraulic and/or pneumatic actuator may support a manual actuation, or it may be used for automizing the movement of the extension structure, respectively.

BRIEF DESCRIPTION

Some of the embodiments will be described in detail, with reference to the following figures, wherein like designations denote like members, wherein.

DETAILED DESCRIPTION

Figure 1:
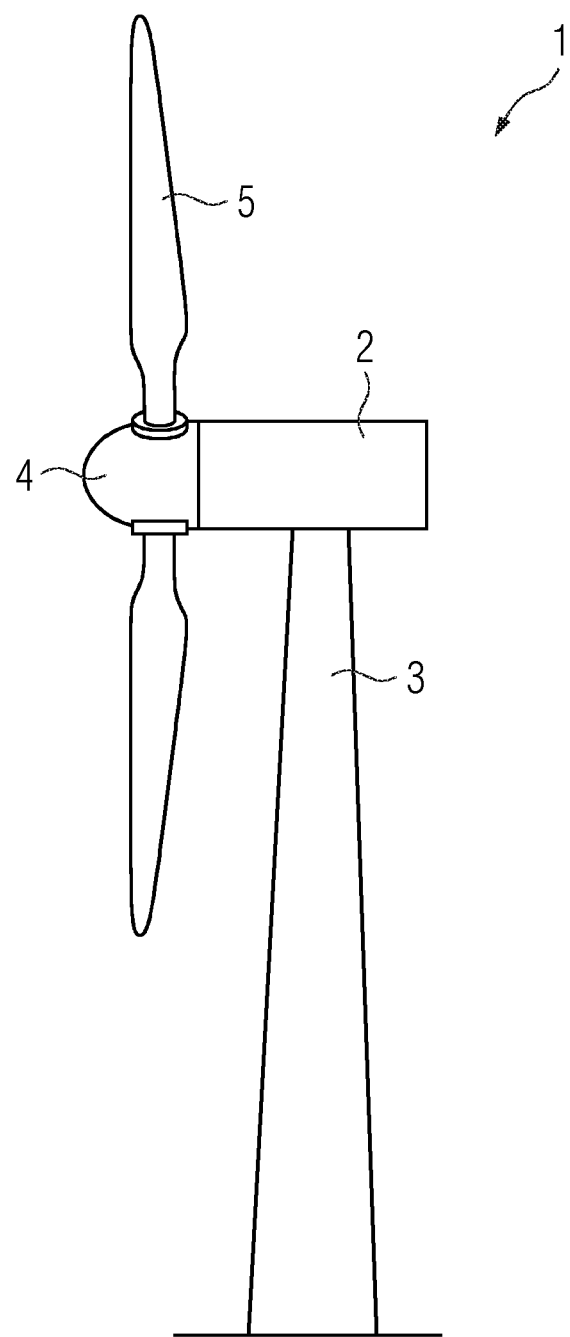
FIG. 1 shows an embodiment of a wind turbine according to embodiments of the invention.

In FIG. 1, a wind turbine 1 according to embodiments of the invention is shown. The wind turbine 1 comprises a nacelle 2, which is arranged on top of a tower 3. The nacelle 2 supports a hub 4 and a plurality of rotor blades 5, which are attached to the hub 4 forming the rotor of the wind turbine 1.

Figure 2:
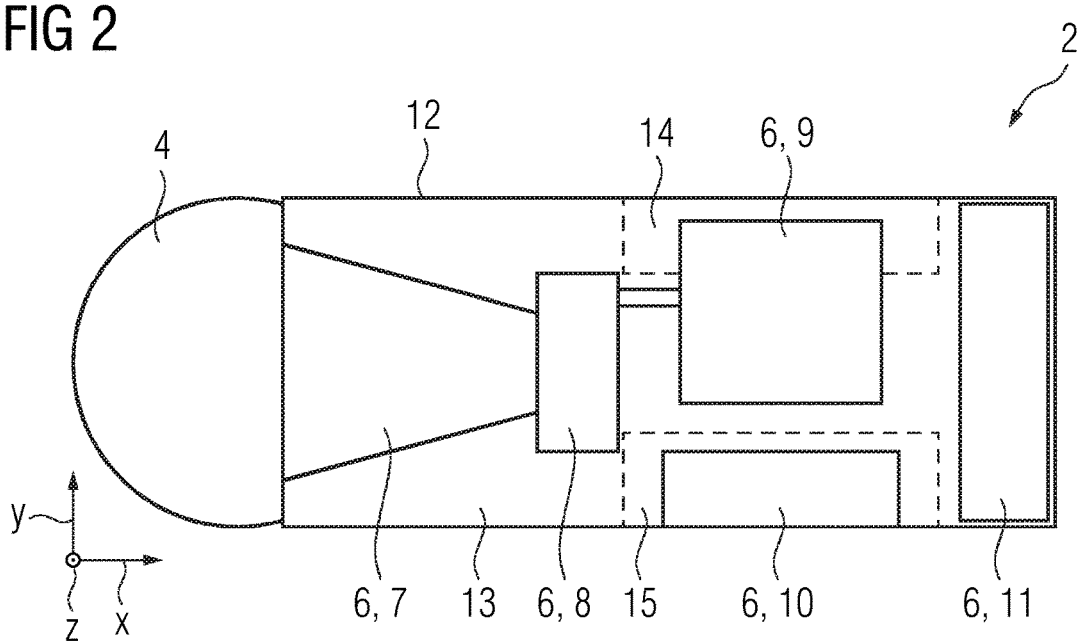
FIG. 2 shows a detailed view of the nacelle of the wind turbine according to embodiments of the invention with the extension structures arranged in the retracted position.

In FIG. 2, a detailed view of the nacelle 2 is shown. In the nacelle 2, a plurality of components 6 used for the generation and/or the conversion of energy is arranged. The components 6 comprise a main shaft 7, a gear box 8, a generator 9, a converter 10 and a transformer 11.

The shaft 7 is attached to the hub 4 and to the gear box 8. The gear box 8 is connected to the generator 9 that is used for the generation of electrical energy. The generator 9 is electrically connected (connection means not shown) to a converter 10 and to a transformer 11. The converter 10 and/or the transformer 11 may be used for creating a current for energizing a part of the generator 9 and/or for converting electrical energy generated by the generator 9, in particular prior to feeding the electrical energy into a power grid. To protect the components 6 from environmental influences like wind and rain, the nacelle 2 comprises a housing structure 12 that encloses an inner volume 13 of the nacelle 2 in which the components 6 are arranged.

In addition, the nacelle 2 comprises two movable extension structures 14, 15, which may be used for increasing the inner volume 13 of the nacelle 2. In FIG. 2, the extension structures 14, 15 are shown in a retracted position, in which no increase of the inner volume 13 occurs. The extension structures 14, 15 may be in the retracted position for example during a normal operation of the wind turbine 1 and/or during transport and/or installation of the nacelle 2.

Figure 3:
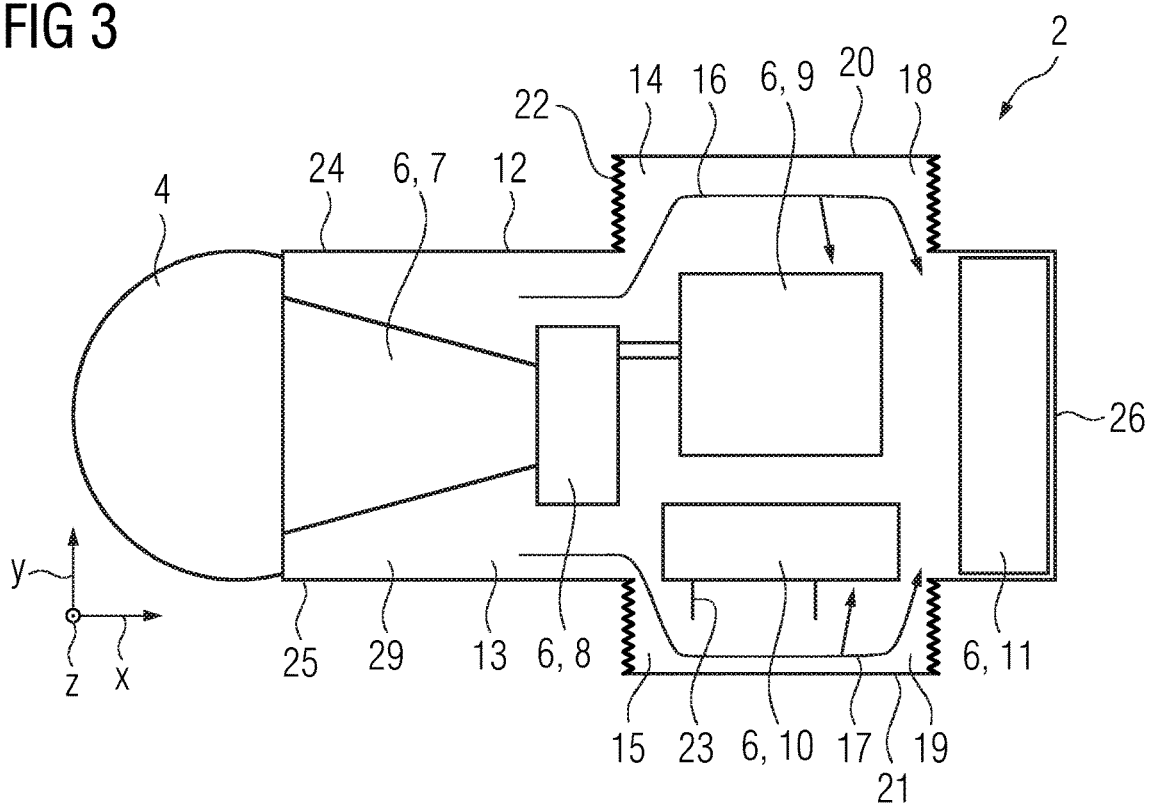
FIG. 3 shows the nacelle of the embodiment of the wind turbine with the extension structures arranged in the extended position.

In FIG. 3, the extension structures 14, 15 are each shown in the extended position, each increasing the inner volume 13 of the nacelle 2. The extension structures 14, 15 create additional space in front of the generator 9, or the converter 10, respectively. As indicated by the arrows 16, 17, the access to the generator 9 and the converter 10 is facilitated. Furthermore, also the access of the transformer 11 can be facilitated, since additional space is provided for a movement of a worker around the generator 9 and the converter 10.

The extension segments 14, 15 extend the inner volume 13 of the nacelle 2 in a lateral direction, hence in the direction of the length of the nacelle 2 denoted as x-direction and/or the width of the nacelle 2 denoted as y-direction. By the extension structures 14, 15, a local increase of the width of the nacelle 2 becomes possible when additional space inside the nacelle 2 is required.

The extension structures 14, 15 each comprise a floor segment 18, 19 which enlarges a floor structure 29 of the nacelle 2. The floor segments 18, 19 may abut or adjoin the immobile floor structure 20 in the nacelle 2 so that additional floor space in the vicinity of the generator 9 and the converter 10 can be provided. The floor segments 18, 19 may adjoin the floor structure 29 at an equal height or with a height offset. This allows for providing an increased floor structure 29, or an increased platform size, respectively, inside the nacelle 2.

In order to protect the components 16 from environmental influences also in the extended position of the extension structures 14, 15, a housing segment 20, 21 of the housing structure 12 is coupled to each of the extension structures 14, 15. The housing segments 20, 21 of the housing structure 12 are coupled to the remainder of the housing structure 12, hence to the immobile sections of the housing structure 12, by a plurality of foldable connection segments 22.

The connecting structures 22 may be foldable and/or made at least partly of a flexible material in order to allow for their folding and/or their compression when the extension structures 14, 15 are moved in the retracted position. The connection segments 22 may comprise for instance a foldable bellow structure, so that they may be fold in the retracted position and unfold in the extended position of the respective extension structure 14, 15.

Also on the top side, hence on the roof side of the nacelle 2, and on the bottom side of the nacelle 2, for instance underneath the floor segments 18, 19, connection segments 22 may be arranged for creating a closed shell, or a closed canopy, respectively, surrounding the components 6 also when the extension structures 14, 15 are in the extended position.

By moving the extension structures 14, 15 in the extended position, the distance between at least one of the components 6 and at least one section of the housing structure 12 is increased. By the extension structure 14, the distance between the housing segment 20 coupled to the extension structure 14 and the generator 9 is increased. Correspondingly, the distance between the housing segment 21 coupled to the extension structure 15 and the converter 10 is increased by the extension structure 15. It is possible that at least one of the components 6, for instance the converter 10, comprises a housing with one or more doors 23, which may be opened using the additional volume created by the extended extension structure 15 in front of the converter 9.

Providing the extension structures 14, 15 allows for housing larger components 6 in the nacelle 2, since the necessity of providing access areas and/or transporting paths in the nacelle 2 may be circumvented. Only in the case that the additional space is required, the extension structures 14, 15 may be extended to provide the additional floor space, or the increased inner volume 13, respectively. This facilitates for instance maintenance tasks in the nacelle 2, which require access to the components 6 and the movement of a worker in inside the nacelle 2.

Figure 4:
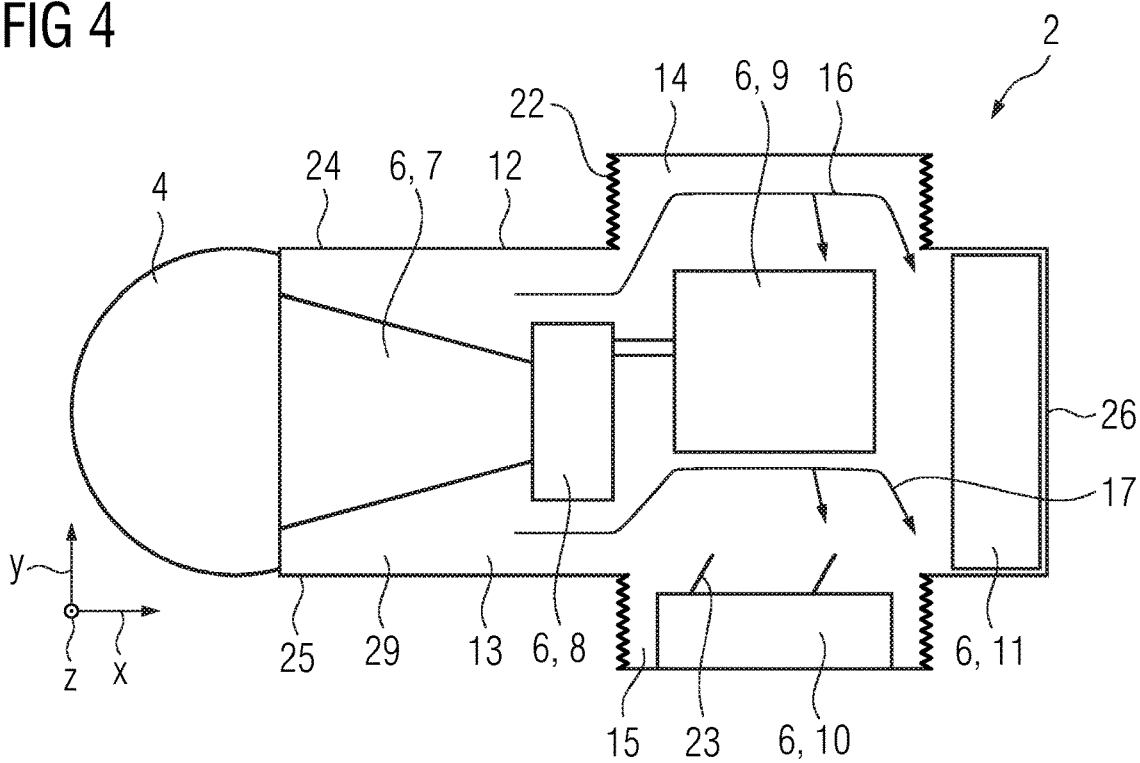
FIG. 4 shows a further embodiment of a wind turbine with the extension structures arranged in the extended position.

In FIG. 4, a further embodiment of a wind turbine 1 is shown. In this embodiment, one of the components 6, namely the converter 10, is coupled to the extension structure 15. By moving the extension structure 15 from the retracted position to the depicted extended position, the distance between the converter 10 and the generator 9 is increased. This also facilitates the access to both the generator 9 and the converter 10. The converter 10 may be connected to the generator 9 and/or the transformer 11 by one or more flexible cables so that the relative movement of the converter 9 is not constrained.

In both embodiments, it is possible that the components 6 are arranged differently inside the nacelle 2 or that additional components 6 or not all of the depicted components 6 are present. It is also possible that on each sidewall 24, 25, more than one extension structure 14, 15 is arranged, for instance to provide additional space between the shaft 7, the gear box 8 or another component arranged in the interior of the nacelle 2. Alternatively, it is also possible that only one of the extension structures 14, 15 is used.

Alternatively, or additionally, at least one extension structure arranged at a rear end 26 of the nacelle 2 may be provided. Such an extension structure may be used if additional space for accessing for instance the transformer 11 is required.

In all embodiments, the extension structures 14, 15 arranged on the sidewalls 24, 25 of the nacelle 2 may comprise a length in x-direction between 1 m and 10 m, in particular between 2 m and 5 m. The width of the extension structures 14, 15 in y-direction may be between 0.3 m and 3 m, in particular between 0.5 m and 0.8 m. Correspondingly, for an extension structure 14, 15 arranged at the rear end 26, the length direction extends in y-direction and the width direction extends in x-direction, respectively.

Figure 5:
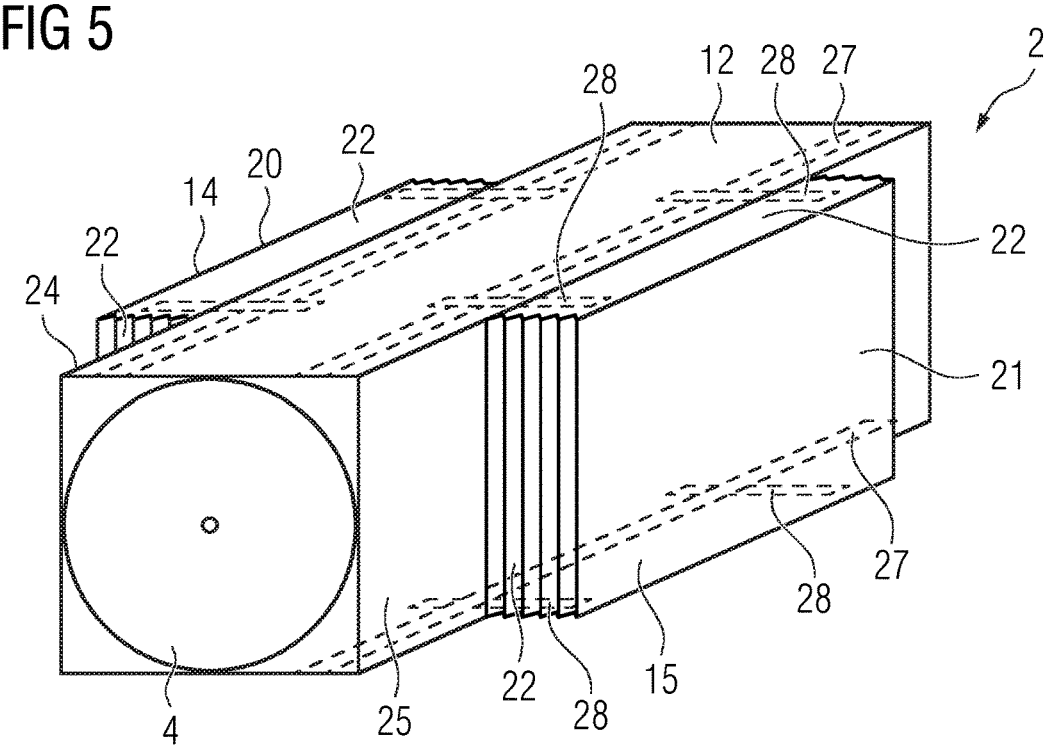
FIG. 5 shows an outer view of the nacelle of one of the embodiments.

In FIG. 5, a perspective view of the nacelle 2 according to one of the aforementioned embodiments is shown. The housing segments 20, 21 of the extension structures 14, 15 are connected to a roof section of the housing structure 12 by one flexible and/or foldable connection segment 22. Likewise, also on the bottom side of the nacelle 2, a connection segment 22 is arranged. The extension structures 14, 15 form each a movable compartment, which may be used to locally increase the inner volume 13, or the inner and outer dimensions, respectively, of the nacelle 2 by arranging it in the extended position.

The extension structures 14, 15 are attached to a supporting structure 27 of the nacelle 2, which is shown in dashed lines. The supporting structure 27 may be or comprise for instance a bedframe and/or a frame structure coupled to a bedframe of the nacelle 2.

The extension structures 14, 15 are slidably coupled to the supporting structure 27. Therefore, one or more rails 28 are used for coupling each of the extension structures 14, 15 to the supporting structure 27. In this embodiment, two rails 28 are used for coupling the extension structures 14, 15 on a bottom side of the nacelle 2 and two rails 28 are used for coupling the extension structures 14, 15 to the supporting structure 27 on the top side of the nacelle 2.

The rails 28 allow for sliding the extension structures 14, 15 between the extended position and the retracted position. The extension structures 14, 15 may be moved between the retracted position and the extended position by at least one manually operatable actuator and/or by at least one electric, hydraulic and/or pneumatic actuator (not depicted).

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
a nacelle and a plurality of electrical and/or mechanical components for generation and/or conversion of energy, wherein the nacelle comprises a housing structure enclosing an inner volume, in which the plurality of electrical and/or mechanical components are arranged,
wherein the nacelle comprises at least one movable extension structure, which is movable between a retracted position and an extended position, and the inner volume enclosed by the housing structure is increased in the extended position;
wherein the at least one movable extension structure is slidably coupled to a supporting structure of the nacelle, and when the at least one movable extension structure is in the extended position, the inner volume is enclosed by the at least one movable extension structure.

2. The wind turbine according to claim 1, wherein the at least one movable extension structure is movable in a lateral direction, and extends the inner volume at a side wall of the nacelle and/or at a rear end of the nacelle.

3. The wind turbine according to claim 1, wherein a distance between at least one of the plurality of electrical and/or mechanical components and at least one section of the housing structure and/or a distance between at least two of the plurality of electrical and/or mechanical components is increased in the extended position.

4. The wind turbine according to claim 3, wherein positions of the plurality of electrical and/or mechanical components in the nacelle remain the same when the at least one movable extension structure is arranged in the extended position, or wherein at least one of the plurality of electrical and/or mechanical components is coupled to the at least one movable extension structure, wherein a position of a component relative to a remainder of the plurality of electrical and/or mechanical components is changed when the at least one movable extension structure is arranged in the extended position.

5. The wind turbine according to claim 4, wherein the component coupled to the at least one movable extension structure is a converter and/or a transformer.

6. The wind turbine according to claim 1, wherein the at least one movable extension structure comprises a floor segment, and, in the extended position, a floor structure of the nacelle is extended by the floor segment of the at least one movable extension structure.

7. The wind turbine according to claim 1, wherein the at least one movable extension structure comprises a length between 1 m and 10 m, and a width between 0.3 m and 3 m.

8. The wind turbine according to claim 1, wherein at least one housing segment of the housing structure is attached to the at least one movable extension structure, further wherein the at least one housing segment is connected to further segments of the housing structure by at least one flexible and/or foldable connection segment.

9. The wind turbine according to claim 1, wherein the at least one movable extension structure is coupled to the supporting structure by one or more rails.

10. The wind turbine according to claim 1, wherein the at least one movable extension structure is movable by at least one manually operatable actuator and/or by at least one electric, hydraulic and/or pneumatic actuator.

* * * * *